March 11, 1958 P. F. NIESSEN 2,826,441
SEALING DEVICE
Filed May 31, 1955
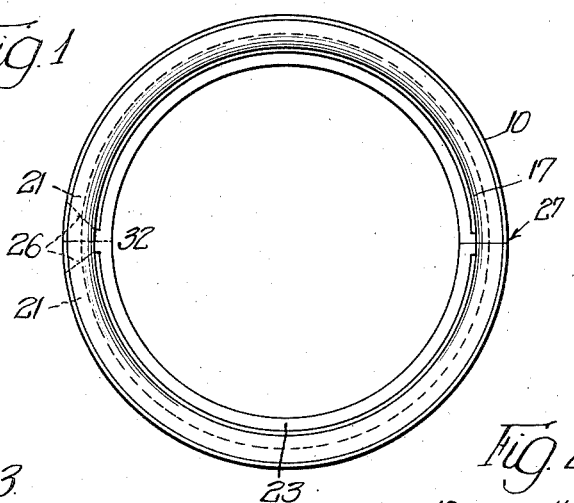
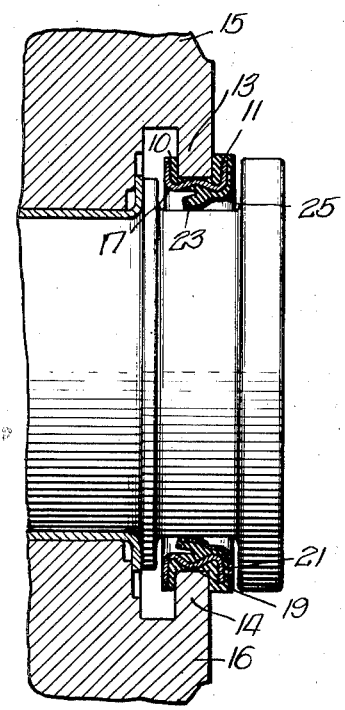
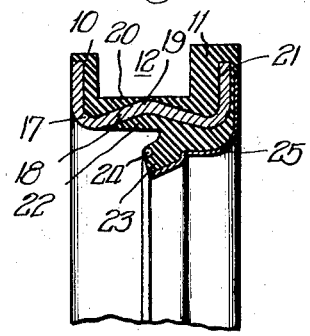
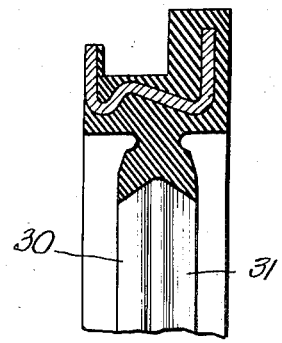
INVENTOR.
Paul F. Niessen, United States Patent Office 2,826,441
Patented Mar. 11, 1958

2,826,441

SEALING DEVICE

Paul F. Niessen, Wheaton, Ill., assignor to Victor Manufacturing & Gasket Co., Chicago, Ill., a corporation of Illinois Application May 31, 1955, Serial No. 511,999

5 Claims. (Cl. 288—13)

This invention relates to devices for forming a fluid tight seal between a shaft and a pair of housing members that fit together to define an opening through which the shaft projects, and has for its principal object the provision of a new and improved sealing device of this kind.

It is a main object of the invention to provide an improved sealing device for the rear main bearing of an internal combustion engine.

Another object of the invention is to provide a sealing device composed of an elastomer reinforced by a metallic ring that contains a bead that forms an essentially metal-to-metal contact with the housing members in which the device is mounted, thereby insuring that the device will remain tight in the housing members so as to maintain a fluid tight joint between the housing members and the sealing device.

Another object of the invention is to provide a sealing device which can be installed as a one-piece seal in a new engine installation and can be cut apart, without impairing its functioning properties, to form a replacement seal for the engine.

Further objects of the invention not specifically mentioned here will be apparent from the detailed description and claims which follow, reference being had to the accompanying drawings in which a preferred embodiment of the invention is shown by way of example and in which:

Fig. 1 is a plan view of the sealing device;

Fig. 2 is a cross sectional view of the device drawn to an enlarged scale;

Fig. 3 is a fragmentary view illustrating the installation of the sealing device in the rear main bearing of an internal combustion engine; and Fig. 4 is a cross sectional view showing a slightly modified form of the device.

In many instances, such as for example the rear main bearing of an internal combustion engine, the housing members terminate in an inwardly projecting flange that defines an opening through which the shaft projects. Sealing devices of the class to which the present invention relates are employed to form a fluid tight seal at this point, thereby to retain in the crankcase of the engine the lubricants by which the rear main bearing is lubricated.

The seal of the present invention is adapted to fit over the flanges on the bearing members and to be supported thereby and to form a fluid tight seal between the housing members and the sealing device. The sealing device carries, as an integral part of it, an inwardly projecting sealing lip which engages the shaft to form a fluid tight seal therewith.

Sealing devices of this kind are composed of elastomers that are impervious to the oils used to lubricate the engine. In certain of the prior art devices of which I am aware, the elastomer is reinforced by a metal ring and the device is provided with a substantial thickness of elastomer adapted to be compressed between this ring and the housing members to form a fluid tight seal therewith.

As is well understood by those skilled in the art, elastomers of the type adaptable for use in the sealing of oil have a tendency to cold flow when subjected to continuous pressures in the range encountered in the sealing of the rear main bearing of an internal combustion engine. This tendency of the elastomer to cold flow is accelerated by the elevated temperatures developed in the engine and oil that comes into contact with the seal. As a result of this cold flow, the seal loosens in the housing members and a leak develops at this point before the sealing lip that engages the shaft has lost its ability to form a fluid tight seal therewith. The present invention seeks to overcome this difficulty so as to render the device capable of maintaining a fluid tight seal for a longer period of time under the adverse conditions encountered.

As will be seen in the drawings, the device of the present invention consists of an elastomer member having radially outwardly extending walls 10 and 11 which define between them a groove 12 that is of such dimension as to snugly fit over the flanges 13 and 14 on the upper member 15 and the lower member 16 respectively of a housing member. The elastomer is reinforced by a metal ring 17 which has a central portion 18 that contains an outwardly extending bead 19 that is located midway between the radial walls 10 and 11 of the elastomer. The metal ring 17 has the shape of an M or "sigma" in cross section. These walls 10 and 11 are connected together by a generally cylindrical elastomer wall 20 that defines the bottom of the groove 12. It will be noted that the wall 20 is very thin at the crest 19 of the bead in the metallic member 17.

The elastomer extends along the outer face of the flange portion 21 of the metallic ring and inwardly therefrom across the inner face of the central portion 18 of the metallic member. Formed integrally with this inner wall 22 is a sealing lip 23 adapted to engage the shaft and form a fluid tight seal therewith. If desired, the sealing lip may be reinforced by a wire ring 24 and may be faced with a low friction fabric 25. The elastomer parts are bonded to the metallic ring in the usual manner.

The crest of the bead 19 is positioned on a circle whose diameter is slightly greater than the inner diameter of the flanges 13 and 14 of the housing members. The outer surface of the elastomer wall 20 is in the form of a cylinder whose diameter is greater than the internal diameter of the flanges 13 and 14. In one instance, the crest of the bead 19 was formed on a diameter .004 of an inch greater than the internal diameter of the flanges on which the sealing device was designed to be fitted, and the elastomer wall covering the crest of this bead was but .002 of an inch thick.

In the manufacture of the sealing device, the elastomer and ring 17 are placed in a suitable mold and molded therein as a continuous ring such as is shown in Fig. 1. The ends of the radially extending walls of the metallic ring 17 are cut away on an angle, as shown at 26 in Fig. 1, and after molding the elastomer is cut along line 27 which, it will be observed, is located midway between the adjacent ends of the metallic ring 17 which is spaced apart at this point. The one-piece sealing unit thus formed can be threaded over the crankshaft of an internal combustion engine prior to assembly of that shaft in the engine block, and as the shaft is placed in the block, flange 13 is registered with the groove 12 in the manner shown in Fig. 3. When the lower bearing member 16 is placed, flange 14 is similarly registered with the groove 12. As the bearing member 16 is drawn down tight on the block, the elastomer in wall 20 is squeezed outwardly, and since the crest of the bead 19 is located on a circle whose diameter is greater than that of the inner surfaces of the flanges 13 and 14, as the lower bearing member 16 is drawn down tight, all or virtually all of the elastomer in the wall 20 will be squeezed out from between the bead and the flanges, and the bead 19 will necessarily be deformed slightly into an outside diameter equal to or slightly less than the inside diameter of the flanges 13 and 14. Side walls 10 and 11 of the elastomer are likewise deformed outwardly as the bearing member 16 is drawn tightly onto the member 15.

As a result of this construction, a metal-to-metal, or virtually metal-to-metal, connection is established between the reinforcing ring 17 of the sealing device and the flanges on which the device is mounted. Any thin wall of elastomer remaining between the bead and housing seals any irregularities that may be present in the surfaces of these members, and since this wall will be very very thin, its tendency to cold flow will be practically nil. The elastomer in wall 20 is deformed into tight sealing engagement between the crest of the bead and the outer edges of the flanges 13 and 14. With this arrangement, even though the larger masses of elastomer cold flow sufficiently to loosen up in the housing members, the sealing device will be maintained tightly therein by the bead and a fluid tight seal between the housing members and the sealing device will thus be maintained notwithstanding the cold flow that may develop in the larger elastomer parts of the seal.

In Fig. 4, I have shown a slightly modified type of seal which embodies the principles hereinabove set forth. This seal is provided with two lips 30 and 31 adapted to engage the shaft. The lip 30, facing inwardly of the housing, prevents the escape of oils outwardly along the shaft, and the lip 31, projecting outwardly of the housing, prevents the entry of moisture, dust, etc., into the housing. Otherwise the seal shown in Fig. 4 is of the same general construction as that heretofore described and a detailed explanation of the device is not deemed necessary.

While many manufacturers of devices such as internal combustion engines prefer a one-piece seal for initial installation in the engine, a two-piece seal is definitely advantageous as a replacement. The device of the present invention can be cut along the line 32 as well as along the line 27, without impairing the efficiency of the device. The two halves thus separated form a two-piece seal, the upper portion of which can be threaded onto the upper flange of the housing and the lower half inserted in the lower member 16 of that housing prior to registry of that member 16 with the upper member 15.

While I have chosen to illustrate my invention by showing and describing a preferred embodiment of it, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claims.

What is claimed is:

1. A device for sealing the space between a shaft and a two-piece housing through which the shaft projects with its axis in the plane of parting of the housing pieces, each of which housing pieces contains an inwardly extending flange which flanges together define a circular opening through which the shaft projects concentrically; which device comprises a pair of semi-circular metallic members each consisting of a central portion extending axially of the shaft and flanges extending outwardly from the ends of said central portion; an elastomer element bonded to the outer side of each metallic member, which element defines an outwardly opening groove, the bottom of which groove is defined by a cylindrical elastomer wall the outer diameter of which is greater than the diameter of said circular opening in the housing pieces; an outwardly extending bead in the central portion of each metallic member, which bead is embedded in the cylindrical elastomer wall and disposed at the center of the outwardly opening groove with its outer crest thinly covered by the elastomer; a second elastomer element integral with the first said element and extending therefrom inwardly along the outer face of one of the flanges and across the inner face of the central portion of each metal member and inwardly therefrom to form a shaft engaging sealing lip.

2. A device as specified in claim 1, in which the metallic members are M-shaped in cross section.

3. A device as specified in claim 1, in which the outer crests of the beads in the metallic members lie on a circle whose diameter is greater by several thousandths of an inch than the inner diameter of the flanges on the housing pieces and in which the beads are deformed by the flanges on the housing pieces pressing against them.

4. A device as specified in claim 1, in which the elastomer covering the beads in the metal members is but a few thousandths of an inch in thickness, which elastomer is displaced laterally off of the beads as the housing pieces are drawn together to form a fluid tight seal between the device and the flanges on the housing pieces.

5. A device as specified in claim 4, in which the seal is formed by essentially metal-to-metal contact between the inwardly extending flanges on the two-piece housing and the beads augmented by elastomer-to-metal contacts on the two sides of the beads against the sides of said inwardly extending flanges.

References Cited in the file of this patent

UNITED STATES PATENTS

| | | |
|---|---|---|
| 2,455,202 | Ware | Nov. 13, 1948 |
| 2,480,116 | Brummer | Aug. 30, 1949 |
| 2,647,002 | Brummer | July 28, 1953 |
| 2,647,777 | Kosatka | Aug. 4, 1953 |